(12) United States Patent
Kawaguchi et al.

(10) Patent No.: US 7,582,581 B2
(45) Date of Patent: Sep. 1, 2009

(54) ALKALI-FREE GLASS

(75) Inventors: Masataka Kawaguchi, Otsu (JP); Masataka Takagi, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 566 days.

(21) Appl. No.: 10/562,268

(22) PCT Filed: Aug. 3, 2004

(86) PCT No.: PCT/JP2004/011403

§ 371 (c)(1),
(2), (4) Date: Dec. 28, 2005

(87) PCT Pub. No.: WO2005/012198

PCT Pub. Date: Feb. 10, 2005

(65) Prior Publication Data

US 2006/0160691 A1  Jul. 20, 2006

(30) Foreign Application Priority Data

Aug. 4, 2003  (JP) ............................. 2003-205812

(51) Int. Cl.
*C03C 3/091* (2006.01)
(52) U.S. Cl. ........................................ 501/67; 501/66
(58) Field of Classification Search ............... 501/66, 501/67
See application file for complete search history.

(56) References Cited

U.S. PATENT DOCUMENTS

| | | | |
|---|---|---|---|
| 2,038,627 A | 4/1936 | Badger | |
| 3,622,296 A | 11/1971 | Buehl | |
| 5,459,202 A | 10/1995 | Martinez et al. | |
| 5,548,028 A | 8/1996 | Tabb | |
| 6,321,062 B1 | 11/2001 | Kitano et al. | |
| 6,468,933 B1 * | 10/2002 | Narita et al. | 501/56 |
| 6,508,083 B1 * | 1/2003 | Naka et al. | 65/134.3 |
| 7,294,594 B2 * | 11/2007 | Kawamoto et al. | 501/27 |
| 2002/0099142 A1 | 7/2002 | Faulkner | |
| 2003/0004273 A1 | 1/2003 | Apostolo et al. | |
| 2004/0186000 A1 | 9/2004 | Kawamoto et al. | |

FOREIGN PATENT DOCUMENTS

| | | |
|---|---|---|
| EP | 0 437 806 A2 | 7/1991 |
| EP | 0 439 734 A1 | 8/1991 |
| EP | 0 656 391 A2 | 6/1995 |
| EP | 1 260 550 A1 | 11/2002 |
| JP | 2-080327 | 3/1990 |
| JP | 11-43350 | 2/1999 |
| JP | 2000-159541 | 6/2000 |
| JP | 2000-321912 | 11/2000 |
| JP | 03/066539 A1 | 2/2002 |
| JP | 2003-137591 | 5/2003 |
| WO | WO 93/22379 | 11/1993 |

OTHER PUBLICATIONS

International Search Report of PCT/JP2004/011403, mailed Nov. 18, 2004.

* cited by examiner

*Primary Examiner*—Jerry Lorengo
*Assistant Examiner*—Elizabeth A Bolden
(74) *Attorney, Agent, or Firm*—Drinker Biddle & Reath LLP

(57) ABSTRACT

A subject for the invention is to provide an alkali-free glass which is capable of reducing or totally eliminating $As_2O_3$ and which has fewer bubble inclusion than that in the prior technology.

The invention relates to an alkali-free glass which comprises $SiO_2$ in an amount of from 40 to 70% by weight; $Al_2O_3$ in an amount of from 6 to 25% by weight; $B_2O_3$ in an amount of from 5 to 20% by weight; MgO in an amount of from 0 to 10% by weight; CaO in an amount of from 0 to 15% by weight; BaO in an amount of from 0 to 30% by weight; SrO in an amount of from 0 to 10% by weight; ZnO in an amount of from 0 to 10% by weight, each based on the total amount of said glass, and helium and/or neon in an amount of from 0.0001 to 2 µl/g (0° C., 1 atm.).

8 Claims, No Drawings

ALKALI-FREE GLASS

This application is the US national phase of international application PT/JP2004/011403. filed 3 Aug. 2004, which designated the U.S. and claims priority of JP 2003-205812, filed 4 Aug. 2003, the entire contents of each of which ar hereby incorporated by reference.

FIELD OF THE INVENTION

The present invention relates to an alkali-free glass, particularly an alkali-free glass utilized as a transparent glass substrate for a liquid crystal display.

BACKGROUND ART

An alkali-free glass is employed as a transparent glass substrate for a liquid crystal display or the like. Such alkali-free glass is required to be free from bubbles constituting defects in the display.

The alkali-free gla is melted at a higher temperature in comparison with glass containing an alkali melted component, because of a higher viscosity of the molten glass. In melting the alkali-free glass, a vitrifying reaction usually takes place at from 1200 to 1400° C., and bubble reduction and homogenization are executed at a high temperature of 1500° C. or higher. Therefore, it is necessary to utilize a fining agent capable of releasing fining gas at least in a high temperature region where the bubble reduction and the homogenization are executed. Because of such situation, $As_2O_3$ capable of generating fining gas in a wide temperature range has been widely employed as the fining agent for the alkali-free glass. However, $As_2O_3$ is a hazardous material and it is desired to reduce or totally replace such material.

Therefore, methods utilizing $SO_3$, $Sb_2O_3$, $SnO_2$, $Cl_2$ or the like as an alternative fining agent for $As_2O_3$ are proposed (for example, patent references 1 and 2).

[Patent Reference 1]
JP-A-11-43350
[Patent Reference 2]
JP-A-2000-159541

DISCLOSURE OF THE INVENTION

The alternative fining agent mentioned above has enabled to bring a number of bubble inclusion, called seed, of the glass to a practically acceptable level, but fewer bubble inclusion is required along with a recent increase in the size of the liquid crystal display screen.

An object of the present invention is to provide an alkali-free glass which is capable of reducing or totally eliminating $As_2O_3$ and which has fewer bubble inclusion than that in the prior technology.

The present inventors have found that bubbles in the molten glass can be completely eliminated or significantly reduced by including a specific amount of an inert gas component such as helium or neon, as a component providing a fining effect in the alkali-free glass, in the molten glass and have thus made the present invention.

More specifically, the present invention has the following composition.

(1) An alkali-free glass which comprises:
$SiO_2$ in an amount of from 40 to 70% by weight;
$Al_2O_3$ in an amount of from 6 to 25% by weight;
$B_2O_3$ in an amount of from 5 to 20% by weight;
MgO in an amount of from 0 to 10% by weight;
CaO in an amount of from 0 to 15% by weight;
BaO in an amount of from 0 to 30% by weight;
SrO in an amount of from 0 to 10% by weight;
ZnO in an amount of from 0 to 10% by weight,
each based on the total amount of said glass, and
helium and/or neon in an amount of from 0.0001 to 2 μl/g (0° C., 1 atm.).

(2) The alkali-free glass according to the above (1), which further comprises a fining component.

(3) The alkali-free glass according to the above (2), wherein the fining component is at least one selected from the group consisting of $SO_3$, $Sb_2O_3$, $SnO_2$ and $Cl_2$.

(4) The alkali-free glass according to the above (3), wherein $SO_3$ is contained in an amount of from 0.0001 to 0.03% by weight based on the total amount of said glass.

(5) The alkali-free glass according to the above (3), wherein $Sb_2O_3$ is contained in an amount of from 0.05 to 3% by weight based on the total amount of said glass.

(6) The alkali-free glass according to the above (3), wherein $SnO_2$ is contained in an amount of from 0.05 to 1% by weight based on the total amount of said glass.

(7) The alkali-free glass according to the above (3), wherein $Cl_2$ is contained in an amount of from 0.005 to 1% by weight based on the total amount of said glass.

(8) A transparent glass substrate for a liquid crystal display which is obtainable by the alkali-free glass according to any one of the above (1) to (7).

In the invention, "alkali-free" means that alkali metal oxides ($Li_2O$, $Na_2O$, and $K_2O$) are present in an amount of 0.2% by weight or less.

BEST MODE FOR CARRYING OUT THE INVENTION

Unless otherwise indicated, the term "%" hereinafter means "% by weight" based on the total amount of glass. In addition, the term "% by weight" have a same meaning as "% by mass".

The expression "X is contained in an amount of from 0 to Y %" means that X is either not present, or is higher than 0% and up to Y %.

In the molten glass, the elements form a network state of a weak bonding force, and show irregular relative positional changes involving elongational, rotational and angular vibrations more vigorously at a higher temperature. However, helium or neon, because of a closed-shell structure of the electrons in the atomic structure, shows a very low reactivity and a small dimension, as will be explained later.

Therefore, helium or neon, scarcely binding with the elements constituting the molten glass and having a sufficiently small dimension capable of passing through a gap in the vibrating network mentioned above, can easily diffuse into a bubble present as a defect in the molten glass, without being affected by the surrounding elements.

Therefore, by contacting helium or neon with the molten glass including a plurality of fine bubble defects, it is possible to rapidly expand the size of the fine bubbles incorporated in the molten glass. As a result, the bubbles with an expanded size show a larger floating power and float rapidly, whereby the molten glass is promptly fined. Helium or neon thus provides a fining effect in the molten glass, and such effect is enhanced in a condition where the molten glass contains various fining agents to be explained later.

This is because, in addition to the fining effect of helium or neon itself and the fining effect of the various fining agents, a multiplying effect is obtained by diffusion of helium or neon in fine bubbles generated by the various fining agents.

Helium or neon to be employed in the invention, being classified as inert gas or rare gas and having a stable closed shell structure, is present in the state of a single-atom molecule. Helium is the lightest element among the rare gases, shows a very small dimension in structure and a very weak Van der Waals attractive force, and remains in a liquid phase even at the absolute zero temperature without solidifying under an atmospheric pressure. Neon has a smaller dimension next to helium among the rare gases, and assumes a stable structure in a single-atom molecule as in the case of helium.

Therefore, in a glass composition prepared by melting at a high temperature following by cooling, helium or neon is present in a state trapped in a pore of a glass network structure constituted by other components.

Helium and/or neon is not involved in the formation of the glass network structure, but an amount of 0.0001 μl/g or higher singly or in a united amount in the glass provides a fining effect. Also an amount of 0.06 μl/g or higher enables a secure fining effect. Also for realizing a fining effect even under a severe condition wherein the glass has a higher content of gasifyable components, there is more preferred a content of 0.1 μl/g or higher which provides the molten glass with a sufficient fining effect.

On the other hand, a content of 2 μl/g or less is desirable because it can avoid re-boiling, when the glass composition is heated again. An upper limit content not causing the re-boiling is preferably 1.5 μl/g or less, though it is variable depending on a glass composition and a heating condition. Such upper limit of 1.5 μl/g is shifted lower to 1.0 μl/g in case of a glass composition also comprising a fining agent other than helium and/or neon, since the re-boiling is facilitated.

Therefore, following ranges are preferred for the content of helium and neon. When the glass composition does not comprise a fining agent other than helium and neon, a content range providing the fining effect even under a severe condition and not easily causing the re-boiling is preferably 0.1 to 1.5 μl/g. On the other hand, when the glass composition comprises a fining agent in addition to helium and neon, the range is preferably 0.1 to 1.0 μl/g.

Helium or neon can be added to the glass composition of the invention for example by a method of utilizing a substance containing helium or neon at a high concentration or glass cullets containing helium or neon as a raw material, a method of melting the raw materials in a helium- or neon-containing atmosphere, or a method of contacting molten glass with a helium- or neon-containing atmosphere.

For contacting the molten glass with a helium- or neon-containing atmosphere, there can be employed a method of introducing helium or neon into a container of molten glass, melting glass in a container with a gas permeability and maintaining a helium- or neon-containing atmosphere around the container, or a method of bubbling helium or neon with a refractory nozzle.

In case of bubbling, a porous refractory material employed at an end of the nozzle facilitates efficient diffusion of helium or neon into the glass.

The alkali-free glass of the present invention preferably comprises a fining agent component in addition to helium and/or neon in the aforementioned range.

The fining agent is not especially limited, but it is preferable at least one selected from the group consisting of $SO_3$ (sulfate), $Sb_2O_3$, $SnO_2$ and $Cl_2$ (chloride).

The content of the fining agent as a remaining amount in the glass is preferably 0.0001 to 0.03% for $SO_3$, 0.05 to 3% for $Sb_2O_3$, 0.05 to 1% for $SnO_2$ and 0.005 to 1% for $Cl_2$ individually.

The fining agents mentioned above may be employed singly, but are preferably employed in a combination of two or more thereof in order to obtain a higher fining effect. A combination of the fining agents includes following examples:

(i) $SO_3$ in an amount of from 0.0001 to 0.03% and $SnO_2$ in an amount of from 0.05 to 1%;

(ii) $Sb_2O_3$ in an amount of from 0.05 to 3% and $SnO_2$ in an amount of from 0.05 to 1%;

(iii) $Sb_2O_3$ in an amount of from 0.05 to 3% and $Cl_2$ in an amount of from 0.005 to 1%;

(iv) $Sb_2O_3$ in an amount of from 0.05 to 3%, $SnO_2$ in an amount of from 0.05 to 1% and $Cl_2$ in an amount of from 0.005 to 1%;

(v) $SO_3$ in an amount of from 0.0001 to 0.03% and $Cl_2$ in an amount of 0.005 to 1%; and (6) $SnO_2$ in an amount of from 0.05 to 1% and $Cl_2$ in an amount of from 0.005 to 1%.

Each fining agent mentioned above exhibits a high fining effect by being present with helium and/or neon, and remains partly in the glass composition after cooling even if it is denatured by a pyrolysis or an oxidation-reduction reaction in high-temperature melting.

A sulfate decomposes at a temperature range of about 1200 to 1500° C., and generates a large amount of fining gas (sulfur dioxide, oxygen gas) upon decomposition. $SO_3$ decomposes at a high temperature of 1400° C. and is optimum for a glass having a vitrifying process at a high temperature, such as alkali-free glass. More specifically, $SO_3$ functions effectively as a fining agent in case of melting glass having a temperature, corresponding to a viscosity of $10^{2.5}$ dPa·s, of 1500° C. or higher.

However, solubility of $SO_3$ in glass decreases with a decrease in the alkali content, and it is very low in case of an alkali-free glass. Stated differently, $SO_3$ releases a large amount of gas in the vitrifying process, but the fining effect is reduced in a fining step after the vitrification since $SO_3$ remains in a smaller amount therein.

$Sb_2O_3$ and $SnO_2$ release a large amount of fining gas (oxygen gas) by a chemical reaction involving a change in valence number of Sb ion and Sn ion. More specifically, $Sb_2O_3$ (trivalent) once changes to $Sb_2O_5$ (pentavalent) at a low temperature range of several hundred degrees and releases a large amount of fining gas upon returning to $Sb_2O_3$ (trivalent) at about 1200 to 1300° C. Therefore the gas generated in the vitrifying process of the alkali-free glass can be expelled from the molten glass. Also $SnO_2$ (tetravalent) releases a large amount of fining gas upon changing to SnO (divalent) at 1400° C. or higher, and exhibits its effect at a homogenizing melting at a higher temperature.

A chloride decomposes and evaporates in a temperature range of 1200° C. or higher to generate fining gas (chlorine gas etc.), and, showing vigorous decomposition and evaporation in a high temperature range of 1400° C. or higher to generate a large amount of chlorine gas, is effect for fining at a homogenizing melting.

Therefore, a combination of the fining agents having different temperature ranges for generating the fining gas enables to generating a fining gas over a wide temperature range from the vitrifying reaction at a relatively low temperature to the homogenizing melting at a high temperature, and achieves an even higher fining effect by the presence of helium and/or neon at the same time.

The fining agent is not particularly restricted in a method of addition, and may be added to a glass batch or may be added later to the molten glass. Otherwise it may be added at the same time as the addition of helium or neon. It is also possible to add the aforementioned component into the molten glass as an eluting component from a container at the melting or a refractory material immersed in the molten glass. It is furthermore possible to obtain an optimum addition amount by adding the fining agent alternately with helium or neon or by gradually increasing or decreasing the amount of addition under confirmation of the fining effect.

In the following there will be explained components other than the fining component in the alkali-free glass of the invention.

$SiO_2$ is a component constituting a network of the glass, and is present in an amount of from 40 to 70%, preferably from 45 to 65%. When the amount of $SiO_2$ is 40% or more, it is preferable because it is easy to maintain a good chemical resistance and it is difficult to cause a low strain point thus to maintain a good heat resistance. While, the amount thereof is 70% or less, it is preferable because a viscosity at a high temperature is difficult to be increased thereby it is easy to maintain a good melting property, and it can prevent a devitrifying substance such as cristobalite from being precipitated.

$Al_2O_3$ is a component improving a heat resistance and a devitrification resistance of the glass, and is present in an amount of from 6 to 25%, preferably from 10 to 20%. When the amount of $Al_2O_3$ is 6% or more, a devitrifying temperature is difficult to be significantly increased and it can prevent a devitrifying substance from being generated in the glass. While, the amount thereof is 25% or less, it is preferable because it is easy to maintain a good acid resistance, especially a good resistance to buffered hydrofluoric acid, thereby it can prevent a white turbidity from being generated on the glass surface.

$B_2O_3$ is a component functioning as a flux and reducing viscosity thereby facilitating melting, and is present in an amount of from 5 to 20%, preferably from 6 to 15%. When the amount of $B_2O_3$ is 5% or more, it is preferable because a sufficient effect as the flux can be obtained. Moreover, the amount thereof is 20% or less, it is preferable because it is easy to maintain a good resistance to hydrochloric acid and it is difficult to cause a low strain point thus to maintain a sufficient heat resistance.

MgO is a component reducing the viscosity at high temperature without lowering the strain point thereby facilitating the glass melting, and is present in an amount of from 0 to 10%, preferably from 0 to 7%. When the amount of MgO is 10% or less, it is preferable because it is easy to maintain a goon resistance of glass to buffered hydrofluoric acid.

CaO functions similarly as MgO, and is present in an amount of from 0 to 15%, preferably from 0 to 10%. When the amount of CaO is 15% or less, it is preferable because it is easy to maintain a good resistance of glass to buffered hydrofluoric acid.

BaO is a component elevating the chemical resistance and improving the devitrifying property, and is present in an amount of from 0 to 30%, preferably from 0 to 20%. When the amount of BaO is 30% or less, it is preferable because it is difficult to cause a low strain point thus maintaining a good heat resistance.

SrO has an effect similar to that of BaO, and is present in an amount of from 0 to 10%, preferably from 0 to 7%. When the amount of SrO is 10% or less, it is preferable because it is easy to improve a devitrifying property.

ZnO is a component improving a resistance to buffered hydrofluoric acid and a devitrifying property, and is present in an amount of from 0 to 10%, preferably from 0 to 7%. When the amount of ZnO is 10% or less, it is preferable because it is difficult to cause devitrification of the glass, and it is difficult to cause a low strain point thus maintaining a good heat resistance.

A total amount of MgO, CaO, BaO, SrO and ZnO is preferably from 5 to 30%. When the amount is 5% or more, it is preferable because a viscosity at a high temperature is difficult to be increased, thereby maintaining a melting property, and it becomes difficult to cause devitrification of the glass. On the other hand, when the amount thereof is 30% or less, it is preferable because desirable heat resistance and acid resistance can be obtained.

In addition to the foregoing components, $ZrO_2$, $TiO_2$, $Fe_2O_3$ etc. may be added up to 5% in a total amount.

In the following, a method for producing the alkali-free glass of the present invention will be described.

At first, there is a prepared glass batch so as to obtain a glass of the aforementioned composition. In case of introducing helium or neon, raw materials prepared correspondingly in advance are used. Also in case of using a fining agent such as $SO_3$, $Sb_2O_3$, $SnO_2$, or $Cl_2$, there may be added a sulfate, $Sb_2O_3$, $SnO_2$, or a chloride to the glass batch. As a sulfate, $BaSO_4$, $CaSO_4$ etc. may be utilized. Also as a chloride, $BaCl_2$, $SrCl_2$, $CaCl_2$ etc. may be utilized.

An amount of the sulfate is preferably from 0.005 to 1% by weight in calculation as $SO_3$ based on 100% by weight of the glass batch, and such amount of addition provides $SO_3$ of from 0.0001 to 0.03% in the glass.

When the amount of sulfate is 0.005% or more, it is preferable because the gas generated in the vitrifying process is easy to expel. While, when the amount thereof is 1% or less, it is preferable because it is difficult to cause re-boiling, whereby bubbles do not remain in the glass.

A preferred amount of the sulfate is preferably from 0.01 to 1% in calculation as $SO_3$, more preferably from 0.05 to 1% and further preferably from 0.05 to 0.5%. A preferred amount of $SO_3$ is from 0.0001 to 0.03%, more preferably from 0.0005 to 0.03%, and further preferably from 0.0005 to 0.01%.

An amount of $Sb_2O_3$ is preferably from 0.01 to 3% by weight based on 100% by weight of the glass batch. When the amount of $Sb_2O_3$ is 0.01% or more, it is preferable because the gas generated in the vitrifying process is easy to expel. While, the amount thereof is 3% or less, it is preferable because it is difficult to cause devitrification of the glass. A more preferred amount of $Sb_2O_3$ is from 0.05 to 2%.

An amount of $SnO_2$ is preferably 0.05 to 1% by weight based on 100% by weight of the glass batch. When the amount of $SnO_2$ is 0.05% or more, it is preferable because the bubbles remaining in the molten glass become easy to remove during the fining process. While, the amount thereof is 1% or less, it is preferable because it is difficult to cause devitrification of the glass. A preferred amount of $SnO_2$ is 0.1 to 0.5%.

An amount of chloride is preferably from 0.01 to 2% by weight in calculation as $Cl_2$, based on 100% by weight of the glass batch, and such amount of addition provides $Cl_2$ in an amount of from 0.005 to 1% in the glass. When the amount of chloride is 0.01% or more, it is preferable because the bubbles remaining in the molten glass become easy to expel at the homogenizing melting. While, the amount thereof is 2% or less, it is preferable because an excessively large amount of evaporation is not generated, thereby it is difficult to denaturalize the glass. A preferred amount of chloride is 0.05 to 1% in calculation as $Cl_2$, more preferably 0.05 to 0.5%, and a preferred content of $Cl_2$ is 0.01 to 0.5%, more preferably 0.01 to 0.3%.

In the invention, it is also possible to utilize a fining agent other than those in the foregoing, such as a fluoride. $Fe_2O_3$ is a component also having a fining effect, but is maintained at 800 ppm or less, preferably 500 ppm or less, since a large amount of $Fe_2O_3$ reduces the visible light transmittance of the glass, unfavorably for application in a display.

Then the prepared glass batch is molten. In case of introducing helium or neon at the melting of the glass, a suitable method can be selected from the aforementioned various methods.

Thereafter, the molten glass is formed into a desired shape. For application in a display, a thin sheet is formed for example by a fusion method, a down-draw method, a floating method or a roll-out method.

An alkali-free glass of the invention can be obtained in this manner. In addition, the glass of the invention comprises:
$SiO_2$ in an amount of from 40 to 70% by weight;
$Al_2O_3$ in an amount of from 6 to 25% by weight;
$B_2O_3$ in an amount of from 5 to 20% by weight;
MgO in an amount of from 0 to 10% by weight;
CaO in an amount of from 0 to 15% by weight;
BaO in an amount of from 0 to 30% by weight;
SrO in an amount of from 0 to 10% by weight;
ZnO in an amount of from 0 to 10% by weight,
each based on the total amount of said glass, and
helium and/or neon in an amount of from 0.0001 to 2 μl/g (0° C., 1 atm.).

A content of helium or neon in the glass is obtained by charging (dropping) a sample of 10 to 500 mg in a Mo crucible placed in a furnace heated to 1600° C., holding the sample for 20 minutes and measuring gas, released under a vacuum of $10^{-9}$ Torr, with a high-sensitivity rare gas mass analyzer.

TABLE 1

| | Sample | | | | | |
|---|---|---|---|---|---|---|
| | 1 | 2 | 3 | 4 | 5 | 6 |
| (% by weight) | | | | | | |
| $SiO_2$ | 60.0 | 54.0 | 56.3 | 58.7 | 62.3 | 64.4 |
| $Al_2O_3$ | 16.0 | 19.6 | 10.7 | 16.5 | 17.5 | 19.5 |
| $B_2O_3$ | 8.5 | 10.5 | 8.4 | 8.3 | 8.5 | 5.5 |
| MgO | 4.0 | — | — | 3.7 | 4.5 | 0.3 |
| CaO | 1.0 | 3.1 | 5.4 | 1.0 | — | 5.9 |
| SrO | 3.5 | 8.9 | 4.2 | 3.1 | 0.6 | 0.6 |
| BaO | 6.0 | 1.8 | 13.0 | 5.8 | 1.1 | 0.3 |
| ZnO | 1.0 | — | 1.3 | 0.9 | 2.7 | — |
| (μl/g) | | | | | | |
| He | 1.980 | 0.982 | 0.498 | 0.004 | 0.132 | NA |
| Ne | NA | NA | NA | NA | 0.183 | 0.465 |
| bubbles (number/100 g) | <1.0 | 5.2 | 6.5 | 7.5 | 3.5 | 1.3 |

TABLE 2

| | Sample | | | | | |
|---|---|---|---|---|---|---|
| | 7 | 8 | 9 | 10 | 11 | 12 |
| (% by weight) | | | | | | |
| $SiO_2$ | 60.0 | 54.0 | 56.3 | 58.7 | 62.3 | 64.4 |
| $Al_2O_3$ | 16.0 | 19.6 | 10.7 | 16.5 | 17.5 | 19.5 |
| $B_2O_3$ | 8.5 | 10.5 | 8.4 | 8.3 | 8.5 | 5.5 |
| MgO | 4.0 | — | — | 3.7 | 4.5 | 0.3 |
| CaO | 1.0 | 3.1 | 5.4 | 1.0 | — | 5.9 |
| SrO | 3.5 | 8.9 | 4.2 | 3.1 | 0.6 | 0.6 |
| BaO | 6.0 | 1.8 | 13.0 | 5.8 | 1.1 | 0.3 |
| ZnO | 1.0 | — | 1.3 | 0.9 | 2.7 | — |
| (μl/g) | | | | | | |
| He | <0.00001 | <0.00001 | <0.00001 | <0.00001 | <0.00001 | <0.00001 |
| Ne | <0.00001 | <0.00001 | <0.00001 | <0.00001 | <0.00001 | <0.00001 |
| bubbles (number/100 g) | 132 | 155 | 168 | 212 | 120 | 295 |

EXAMPLES

In the following the alkali-free glass of the present invention will be explained in detail by examples and comparative examples, but the invention should not be construed as being limited to these Examples.

Example 1

Tables 1 and 2 respectively show Examples (samples Nos. 1 to 6) of the invention and Comparative Examples (samples Nos. 7 to 12).

Each sample was prepared in the following manner. At first, a batch prepared in advance for a predetermined composition corresponding to 500 g of glass was charged in a platinum crucible, which was placed in an atmospheric furnace with an air-tight structure for 4 hours at 1600° C. Then, an atmospheric gas with a He or Ne content of 95% or higher was introduced into the furnace, and the temperature was further maintained for 30 minutes.

Thereafter, glass was taken out, molded in a glass-like carbon mold and cooled. Samples Nos. 7 to 12 constituting Comparative Examples were prepared in the same conditions as above except for employing air as the melting atmosphere.

Then a number of bubbles remaining in the sample was measured with a stereo microscope of a magnification of 20 to 100 times, while the sample was held in an immersion liquid of a refractive index same as that of the glass.

A content of helium or neon in the glass was obtained by charging (dropping) a sample in a Mo crucible placed in a furnace heated to 1600° C., holding the sample for 20 minutes and measuring gas, released under a vacuum of $10^{-9}$ Torr, with a double-collector rare gas mass analyzer (VG5400).

In these tables, NA means "not analyzed".

Example 2

Tables 3 to 8 show Examples of the invention (samples Nos. 13 to 43).

TABLE 3

| | Sample | | | | | |
|---|---|---|---|---|---|---|
| | 13 | 14 | 15 | 16 | 17 | 18 |
| (% by weight) | | | | | | |
| $SiO_2$ | 60.0 | 54.0 | 56.3 | 58.7 | 62.3 | 64.4 |
| $Al_2O_3$ | 16.0 | 19.6 | 10.7 | 16.5 | 17.5 | 19.5 |
| $B_2O_3$ | 8.5 | 10.5 | 8.4 | 8.3 | 8.5 | 5.5 |
| MgO | 4.0 | — | — | 3.7 | 4.5 | 0.3 |
| CaO | 1.0 | 3.1 | 5.4 | 1.0 | — | 5.9 |
| SrO | 3.5 | 8.9 | 4.2 | 3.1 | 0.6 | 0.6 |
| BaO | 6.0 | 1.8 | 13.0 | 5.8 | 1.1 | 0.3 |
| ZnO | 1.0 | — | 1.3 | 0.9 | 2.7 | — |
| $SO_3$ | 0.0004 | 0.0006 | 0.0014 | 0.0048 | 0.0096 | 0.0125 |
| $SnO_2$ | 1.0 | 0.6 | 0.3 | 0.15 | 0.1 | 0.05 |
| (μl/g) | | | | | | |
| He | 1.809 | 0.802 | 0.434 | 0.006 | 0.114 | NA |
| Ne | NA | NA | NA | NA | 0.193 | 0.482 |
| bubbles (number/100 g) | <1.0 | <1.0 | 1.4 | 1.5 | 2.5 | 4.5 |

TABLE 4

| | Sample | | | | |
|---|---|---|---|---|---|
| | 19 | 20 | 21 | 22 | 23 |
| (% by weight) | | | | | |
| $SiO_2$ | 58.4 | 56.2 | 54.6 | 59.3 | 62.4 |
| $Al_2O_3$ | 16.5 | 11.0 | 19.9 | 16.4 | 17.8 |
| $B_2O_3$ | 9.0 | 8.3 | 10.6 | 8.5 | 8.4 |
| MgO | — | — | — | 3.9 | 4.7 |
| CaO | 2.1 | 5.4 | 3.0 | 0.8 | — |
| SrO | 6.5 | 4.0 | 9.0 | 3.0 | 0.8 |
| BaO | 3.5 | 13.2 | 2.0 | 5.9 | 1.3 |
| ZnO | 0.5 | 1.5 | — | 1.0 | 3.1 |
| $Sb_2O_3$ | 0.2 | 0.4 | 1.3 | 1.7 | 2.5 |
| $SnO_2$ | 0.6 | 0.2 | 0.4 | 0.7 | 1.0 |
| (μl/g) | | | | | |
| He | 0.431 | 0.644 | 0.524 | 0.724 | 0.982 |
| Ne | 0.001 | NA | NA | 0.020 | NA |
| bubbles (number/100 g) | 2.2 | 3.0 | 1.0 | <1.0 | <1.0 |

TABLE 5

| | Sample | | | | |
|---|---|---|---|---|---|
| | 24 | 25 | 26 | 27 | 28 |
| (% by weight) | | | | | |
| $SiO_2$ | 65.3 | 57.7 | 48.0 | 56.0 | 59.0 |
| $Al_2O_3$ | 19.8 | 15.7 | 11.0 | 10.5 | 15.0 |
| $B_2O_3$ | 5.6 | 8.5 | 14.5 | 5.5 | 10.5 |
| MgO | 0.3 | 3.9 | — | 2.0 | 0.5 |
| CaO | 6.2 | 0.8 | — | 3.5 | 4.5 |
| SrO | 0.5 | 3.3 | — | 6.0 | 3.0 |
| BaO | 0.4 | 6.1 | 25.0 | 15.0 | 6.0 |
| ZnO | — | 1.1 | — | — | — |
| $Sb_2O_3$ | 0.1 | 0.6 | 1.0 | 1.5 | 2.4 |
| $Cl_2$ | 0.06 | 0.3 | 0.2 | 0.4 | 0.5 |
| (μl/g) | | | | | |
| He | 0.221 | 0.662 | 0.754 | 0.945 | 1.325 |
| Ne | NA | NA | NA | 0.061 | 0.170 |
| bubbles (number/100 g) | 3.8 | 1.9 | 1.5 | <1.0 | <1.0 |

TABLE 6

| | Sample | | | | |
|---|---|---|---|---|---|
| | 29 | 30 | 31 | 32 | 33 |
| (% by weight) | | | | | |
| $SiO_2$ | 58.0 | 63.0 | 66.0 | 54.0 | 64.5 |
| $Al_2O_3$ | 16.0 | 18.0 | 19.5 | 19.5 | 19.0 |
| $B_2O_3$ | 8.5 | 8.0 | 5.5 | 10.5 | 6.0 |
| MgO | 1.0 | 5.0 | — | — | 0.5 |
| CaO | 4.0 | — | 6.5 | 3.0 | 6.0 |
| SrO | 2.0 | 1.0 | 0.5 | 8.5 | 0.5 |
| BaO | 9.5 | 1.0 | 0.5 | 2.0 | 0.5 |
| ZnO | — | 3.0 | 0.5 | — | — |
| $Sb_2O_3$ | 0.5 | 0.3 | 0.9 | 0.1 | 1.9 |
| $SnO_2$ | 0.5 | 0.9 | 0.3 | 0.6 | 0.1 |
| $Cl_2$ | 0.5 | 0.3 | 0.1 | 0.1 | 0.1 |
| (μl/g) | | | | | |
| He | 0.186 | 0.665 | 0.552 | 0.724 | 0.358 |
| Ne | NA | 0.002 | 0.001 | NA | NA |
| bubbles (number/100 g) | 1.2 | <1.0 | <1.0 | <1.0 | <1.0 |

TABLE 7

| | Sample | | | | |
|---|---|---|---|---|---|
| | 34 | 35 | 36 | 37 | 38 |
| (% by weight) | | | | | |
| $SiO_2$ | 58.4 | 56.2 | 54.6 | 59.3 | 62.4 |
| $Al_2O_3$ | 16.5 | 11.0 | 19.9 | 16.4 | 17.8 |
| $B_2O_3$ | 9.0 | 8.3 | 10.6 | 8.5 | 8.4 |
| MgO | — | — | — | 3.9 | 4.7 |
| CaO | 2.1 | 5.4 | 3.0 | 0.8 | — |
| SrO | 6.5 | 4.0 | 9.0 | 3.0 | 0.8 |
| BaO | 3.5 | 13.2 | 2.0 | 5.9 | 1.3 |
| ZnO | 0.5 | 1.5 | — | 1.0 | 3.1 |
| $SO_3$ | 0.0102 | 0.0068 | 0.0047 | 0.0015 | 0.0003 |
| $Cl_2$ | 0.01 | 0.08 | 0.14 | 0.24 | 0.32 |
| (μl/g) | | | | | |
| He | 0.412 | 0.512 | 0.489 | 0.701 | 0.893 |
| Ne | 0.001 | NA | NA | 0.018 | NA |
| bubbles (number/100 g) | 2.2 | 1.3 | 1.1 | <1.0 | <1.0 |

TABLE 8

| | Sample | | | | |
|---|---|---|---|---|---|
| | 39 | 40 | 41 | 42 | 43 |
| (% by weight) | | | | | |
| $SiO_2$ | 65.3 | 57.7 | 48.0 | 56.0 | 59.0 |
| $Al_2O_3$ | 19.8 | 15.7 | 11.0 | 10.5 | 15.0 |
| $B_2O_3$ | 5.6 | 8.5 | 14.5 | 5.5 | 10.5 |
| MgO | 0.3 | 3.9 | — | 2.0 | 0.5 |
| CaO | 6.2 | 0.8 | — | 3.5 | 4.5 |
| SrO | 0.5 | 3.3 | — | 6.0 | 3.0 |
| BaO | 0.4 | 6.1 | 25.0 | 15.0 | 6.0 |
| ZnO | — | 1.1 | — | — | — |
| $Cl_2$ | 0.03 | 0.18 | 0.09 | 0.30 | 0.41 |
| $SnO_2$ | 0.05 | 0.1 | 0.3 | 0.4 | 0.9 |
| ($\mu$l/g) | | | | | |
| He | 0.234 | 0.602 | 0.790 | 0.984 | 1.143 |
| Ne | NA | NA | NA | 0.048 | 0.151 |
| bubbles (number/100 g) | 3.8 | 1.9 | <1.0 | <1.0 | <1.0 |

The samples were prepared and evaluated in the same manner as in Example 1.

As a result, the samples of the examples containing helium or neon showed 4.6 bubbles or less per 100 g and a sufficient fining effect could be confirmed.

While the invention has been described in detail and with reference to specific embodiments thereof, it will be apparent to one skilled in the art that various changes and modifications can be made therein without departing from the spirit and scope thereof.

This application is based on a Japanese patent application filed on Aug. 4, 2003 (Application No. 2003-205812), the contents thereof being herein incorporated by reference.

INDUSTRIAL APPLICABILITY

As explained in the foregoing, the alkali-free glass of the present invention, being free from bubbles constituting defects in display, is suitable for a transparent glass substrate for a display, particularly for a transparent glass substrate for a liquid crystal display.

In addition to the application for the liquid crystal display, it is applicable as a glass substrate for other flat panel displays such as an electroluminescent display, a cover glass for image sensors such as a charge-coupled device, an equal-size proximity solid-state image pickup device or a CMOS image sensor, or a glass substrate for a hard disk or a filter.

The invention claimed is:

1. An alkali-free glass which comprises:
   $SiO_2$ in an amount of from 40 to 70% by weight;
   $Al_2O_3$ in an amount of from 6 to 25% by weight;
   $B_2O_3$ in an amount of from 5 to 20% by weight;
   MgO in an amount of from 0 to 10% by weight;
   CaO in an amount of from 0 to 15% by weight;
   BaO in an amount of from 0 to 30% by weight;
   SrO in an amount of from 0 to 10% by weight;
   ZnO in an amount of from 0 to 10% by weight,
   each based on the total amount of said glass, and
   helium and/or neon in an amount of from 0.0001 to 2 $\mu$l/g (0° C., 1 atm.).

2. The alkali-free glass according to claim 1, which further comprises a fining component.

3. The alkali-free glass according to claim 2, wherein the fining component is at least one selected from the group consisting of $SO_3$, $Sb_2O_3$, $SnO_2$ and $Cl_2$.

4. The alkali-free glass according to claim 3, wherein $SO_3$ is contained in an amount of from 0.0001 to 0.03% by weight based on the total amount of said glass.

5. The alkali-free glass according to claim 3, wherein $Sb_2O_3$ is contained in an amount of from 0.05 to 3% by weight based on the total amount of said glass.

6. The alkali-free glass according to claim 3, wherein $SnO_2$ is contained in an amount of from 0.05 to 1% by weight based on the total amount of said glass.

7. The alkali-free glass according to claim 3, wherein $Cl_2$ is contained in an amount of from 0.005 to 1% by weight based on the total amount of said glass.

8. A transparent glass substrate for a liquid crystal display which is obtainable by the alkali-free glass according to claim 1.

* * * * *